June 3, 1924.  1,495,994

J. FARMER

METAL BURNING APPARATUS

Filed April 20, 1921

INVENTOR
James Farmer
By Kay, Totten & Brown
Attorneys

Patented June 3, 1924.

1,495,994

UNITED STATES PATENT OFFICE.

JAMES FARMER, OF PITTSBURGH, PENNSYLVANIA, ASSIGNOR OF ONE-HALF TO EUGENE ROALMAN, OF PITTSBURGH, PENNSYLVANIA.

METAL-BURNING APPARATUS.

Application filed April 20, 1921. Serial No. 462,914.

*To all whom it may concern:*

Be it known that I, JAMES FARMER, a citizen of the United States, and resident of Pittsburgh, in the county of Allegheny and State of Pennsylvania, have invented a new and useful Improvement in Metal-Burning Apparatus; and I do hereby declare the following to be a full, clear, and exact description thereof.

My invention relates to metal-cutting torches and similar implements for cutting metals by the use of oxyhydrogen flames and the like.

The object of my invention is to provide metal-cutting implements, of the character indicated, with means for enabling the operator to direct the flame of the torch in a true circle or circular curve while handling the torch in a substantially free-hand manner, and to provide means for adjusting the radius of the circles and curves so described by the flame.

Figure 1:
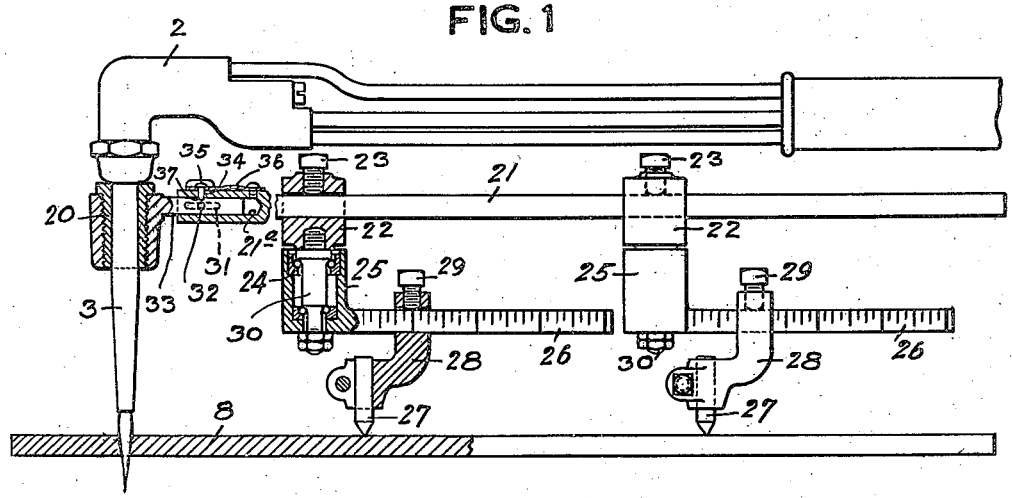
Figure 2:
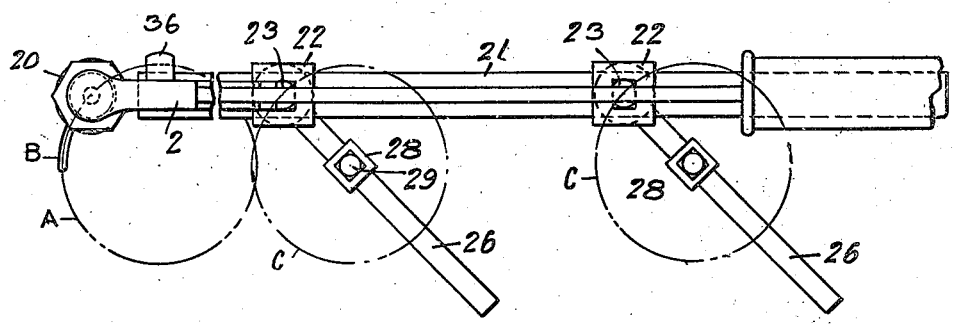

With these and other objects in view, as will more clearly be shown below, my invention provides an attachment which may be applied to standard forms of cutting-torches without changing the construction of the torch, and which is of simple and durable construction. Two examples of my new attachments are shown in the accompanying drawing, in which Fig. 1 is a side elevational view, with parts in section, showing an attachment for cutting circles of relatively small radius; Fig. 2 is a plan view of the construction shown in Fig. 1; and Fig. 3 is a side elevational view, with parts in section, showing a simple form of construction which is especially intended for use in cutting circles of relatively large diameter.

In cutting steel plates, structural shapes and the like by means of cutting-torches, it is often necessary to cut circular openings of various diameters, and this has heretofore been a matter of considerable difficulty. If the opening to be cut is first outlined by scribing a circle on the surface of the metal it is possible for the operator, using a free-hand torch, to follow the circle more or less closely, but even the most experienced operators are unable to hold the flame accurately on the circle. The result is that such holes are cut out roughly and must be finished by a boring or milling operation. Attempts have been made to guide the cutting torch mechanically, the torch being mounted on a movable support which is operated in response to the movement of a guide member with respect to a pattern or templet. Such machines, while capable of accurate work, are necessarily complicated and expensive, and have the further disadvantage that the work must be brought to the machine and the machine carefully adjusted before beginning the cutting operation. The result is that for many kinds of work it is cheaper and more satisfactory to cut the circular holes roughly and finish them afterward. For all of these reasons the cutting of circular holes with cutting-torches has always been considered a troublesome and expensive matter.

According to my present invention I attach to the nozzle of an ordinary cutting-torch a device which, in its simplest form consists of an arm having one end rotatably attached to the nozzle of the torch, and carrying a center pin or axis pin which is adjustable both as to its height and as to its position on the arm. This simple form of applying my invention is shown in Fig. 3 of the drawing. For cutting small circles I prefer to use the form of Figs. 1 and 2, where the arm carries two separate members which are independently provided with graduated arms and with center-pins adjustable on the graduated arms. By these means I am able to cut circles of any diameter down to the diameter of the cutting flame itself.

Figure 3:
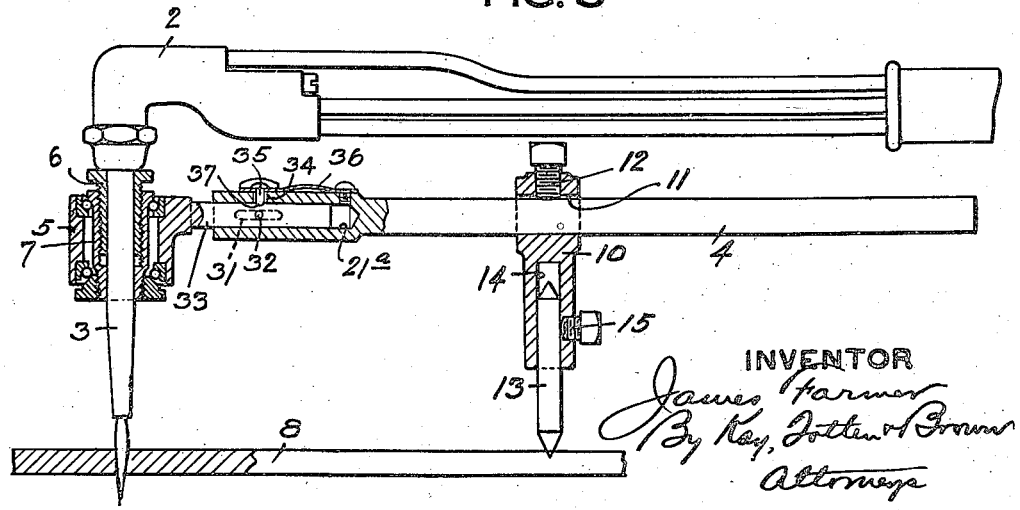

Referring first to Fig. 3 of the drawing, the numeral 2 indicates a cutting torch of well known construction having a nozzle 3. An arm 4 carries at one end a ball bearing, roller bearing, or other anti-friction bearing 5, provided with a central seat to receive the nozzle 3 of the torch 2. As shown, this seat for the nozzle consists of a sleeve 6 of suitable internal diameter to receive the nozzle 3 and provided on its outer surface with screw threads that are received in an internally screw-threaded sleeve 7 forming part of the bearing 5. By adjusting the sleeve 6 with respect to the bearing 5 the position of the lower end of the torch above the work 8 may be varied as desired.

The arm 4 carries a centering device which, as shown, consists of a clamp 10 having a slot 11 to receive the arm 4 and provided with a set-screw 12 for securing the clamp at any desired position of adjustment upon the arm 4. A pivot pin 13 is received in a socket 14 in the member 10 and is fastened adjustably therein by means of a set-screw 15. Suitable graduations may be formed on the arm 4 to indicate the proper setting of the centering device for circles of different radii. The arm 4 may be made of any convenient length, and the clamp 10 may either be attached from one side of the arm 4, as shown, or may extend through a slot cut lengthwise in the arm 4.

In operation, the radius of the circle to be cut is determined and the clamp 10 is placed at the corresponding graduation on the arm 4. The center of the circle to be cut is preferably marked by means of a prick-punch or the like, and the pointed lower end of the pivot pin 13 is placed at this mark. The torch is now ready to cut a complete and accurate circle, which the operator proceeds to do by simply turning the torch around the center pin 13. He guides the torch in a perfectly free-hand manner, but the irregularities due to ordinary free-hand cutting are entirely eliminated.

As stated above, the simple form of my device, shown in Fig. 3 and just described, is particularly designed for cutting circles of considerable size, which may vary from a few inches to several feet in diameter. It is not well suited for cutting very small circles for two reasons. First, because the necessary diameter of the bearing in which the nozzle is received limits the approach of the center clamp to the nozzle, and second, because the center pin 13, when brought close to the flame, is likely to be burned and damaged. I therefore prefer to employ for cutting small circles the attachment shown in Figs. 1 and 2, where the nozzle 3 of the torch 2 is received in a simple swivel bearing 20 formed at one end of an arm 21, corresponding to the arm 4 of Fig. 3. Adjustably mounted on the arm 21 are two clamps 22 provided with set-screws 23 and carrying ball bearings or other anti-friction bearings 24. These bearings 24 include outer sleeves 25 from which extend graduated arms 26, each of which carries a centering pin 27 that is preferably held adjustable in a bracket 28 secured to the arm 26 by means of a set-screw 29. It will be observed that the bracket 28 is offset so that when the clamp 28 is moved to its extreme position to the left against the casing 25 of the bearing 24, the pin 27 is directly beneath the axis of the center pin 30 which is then the axis of rotation of each arm 26. I prefer to provide two of these sets of bearings and centering pins, as shown, in order that the support of the torch upon the work 8 may be as steady as possible.

The exact positions of the clamps 22 upon the arm 21 are not of special importance, as these positions have nothing to do with the radius of the circle which is described by the cutting torch 2. Therefore, the clamps are placed at convenient points on the arm 21, according to the nature of the work being cut. The radius of the circle described by the torch is fixed by the distance between the axis of the centering pin 27 and the axis of its corresponding pivot pin 30. This distance must of course be equal in the case of both centering pins, and the graduations on the arms 26 are so arranged that they show directly the correct distance between these axes. For example, Fig. 1 shows the implement set to cut a circle of ¾ inch radius.

The manner in which this form of my device operates is clearly shown in Fig. 2 where the implement is shown in the process of cutting a circle indicated by the dot-and-dash line A. A portion B of the circle has already been cut and the arms 26 have swung about their individual center pins into the positions shown in this figure. The axes of the pivot pins 30 of the bearings 24 describe circles indicated by the lines C and it will be evident that the diameter of the circle A is exactly the same as the diameter of the circles C.

At the beginning of the cutting operation the first hole that is cut through the work by the flame of the torch is of larger diameter than the width of the slot which is afterwards cut, on account of the longer time that the flame is in contact with the metal at the starting point. For this reason I prefer that the arms 21 be provided with means for temporarily moving the torch nozzle 3 a short distance toward or away from the center pins 13 and 27 at the beginning of the cutting operation, so that if a circular hole is being cut the outer edge of the opening first made will be in correct alignment with the circle, and when a circular disc is being cut from a blank the inner edge of the opening first made is in correct line with the remainder of the circle. For this purpose the end of the arm 4 or 21, as the case may be, is provided with a socket 21$^a$ having slots 31 which receive pins 32 carried by a short arm 33 that is attached directly to the bearing which carries the torch nozzle. An opening 34 is formed above the socket 21$^a$ and a pin 35 carried by a spring finger 36 extends through the opening 34 and into engagement with the arm 33. When the apparatus is in its normal cutting position the pin 35 enters a depression 37 in the top of the arm 33.

At the beginning of the cutting operation the operator lifts the spring finger 36 and moves the torch nozzle in or out, depending on whether the cut is to be made inside or outside of the finished work, this movement of the nozzle being limited by the pins 32 when they reach the end of the slot 31. When the first hole is burned through the work, the operator pulls or pushes the torch sufficiently to cause the spring-pressed pin 35 to snap back into the depression 37, and the torch is then ready to continue cutting the circle.

The device shown in Fig. 1 may be operated to cut large circles by taking off one of the clamps 22, with its attachments, and moving the remaining pivot pin 27 up to its pivot bearing 25, which brings the pivot pins 27 and 30 into alinement. As thus arranged, the device of Fig. 1 resembles that shown in Fig. 3, and operates in exactly the same way. For this purpose, the supporting arm 21 may be provided with graduations similar to those provided in the arm 4 in Fig. 3.

In my copending application for Letters Patent, Serial No. 462,913, filed April 20, 1921, I have described and claimed, both broadly and specifically, a device for holding and guiding cutting torches in predetermined paths. The present application covers the specific means for cutting circles and circular curves and is included within the scope of the broad claims of application No. 462,913.

It will be understood that various changes in the form and arrangement of parts may readily be made without departing from my invention, and I therefore desire that no limitations be imposed on my invention except such as are indicated in the appended claims.

I claim as my invention:

1. An attachment for metal-cutting torches comprising a bearing for the nozzle of the torch, an arm extending laterally from the said bearing and provided with a series of graduations, a pivot member carried by said laterally extending arm, means for securing the said pivot member adjustably upon the said arm, and means independent of said pivot adjusting means for effecting change in radius of said arm.

2. An attachment for metal-cutting torches comprising an anti-friction bearing provided with a seat for receiving the nozzle of the torch, an arm extending laterally from the said bearing and provided with a series of graduations, a pivot pin having a pointed end for engagement with the work, means for adjustably securing the said centering pin to the said arm, and means for effecting refinement of radial adjustment of said nozzle independent of the pivot adjusting means.

3. An attachment for metal-cutting torches comprising a bearing for rotatably receiving the nozzle of the torch, an arm adjustably extending laterally from the said bearing, a plurality of bearings adjustably secured to the said arm, a bearing carried by each of the said members, a graduated arm extending laterally from each of the said bearings, and a pivot pin adjustably carried by each of the said graduated arms.

4. An attachment for metal cutting torches comprising a bearing for rotatably receiving the nozzle of the torch, an arm extending laterally from the said bearing, a plurality of bearings adjustably mounted on the said arm, graduated arms extending from each of the said last-named bearings, a pivot pin adjustably carried by each of the said graduated arms, and means for effecting refinement of adjustment between said nozzle bearing and said first bearing.

5. An attachment for metal cutting torches comprising a bearing for rotatably receiving the nozzle of the torch, an adjustable member extending laterally from the said bearing, a plurality of bearings adjustably mounted on the said arm, graduated arms extending from each of the said last-named bearings, and a centering pivot pin adjustably carried by each of the said graduated arms, each of the said bearings carrying the said graduated arms comprising a central pivot pin forming an axis of rotation for the said graduated arm, and each of the said centering pins being carried in a bracket adapted to position the said centering pin in alignment with the axis of the said pivot pin when the said bracket is in its position nearest to the axis of the said graduated arm.

6. An attachment for metal-cutting torches comprising movable means for holding the nozzle of a cutting torch, adjustable means for directing the movement of the said holding means, and means for temporarily changing the position of the said holding means with respect to the said directing means at the beginning of the cutting operation.

7. An attachment for metal-cutting torches comprising movable means for holding the nozzle of a cutting torch, adjustable means for directing the movement of the said holding means in a circular path, and means for moving the said holding means temporarily toward or away from the axis of the said circular movement at the beginning of the cutting operation and for thereafter fixing the said holding means in normal cutting position.

8. An attachment for metal-cutting torches comprising a bearing for receiving the nozzle of a cutting torch, an arm extending laterally from the said bearing, a pivot member adjustably carried by the said arm and means for connecting the said arm to the said bearing, the said connecting means comprising a socket carried by one of said parts, an arm carried by the other part and extending into said socket and having a limited lengthwise movement therein, and a spring-pressed pin adapted to hold the said arm in a position between the limits of its said lengthwise movement.

In testimony whereof, I the said JAMES FARMER have hereunto set my hand.

JAMES FARMER.

Witnesses:
EDITH K. FREESE,
JOHN F. WILL.